(12) United States Patent
Sasaki et al.

(10) Patent No.: US 11,731,608 B2
(45) Date of Patent: Aug. 22, 2023

(54) VEHICLE CONTROLLER, VEHICLE CONTROL SYSTEM, AND HYBRID VEHICLE

(71) Applicant: TOYOTA JIDOSHA KABUSHIKI KAISHA, Aichi-ken (JP)

(72) Inventors: Hirotaka Sasaki, Nagoya (JP); Kunihiko Jinno, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 125 days.

(21) Appl. No.: 17/530,478

(22) Filed: Nov. 19, 2021

(65) Prior Publication Data
US 2022/0219672 A1    Jul. 14, 2022

(30) Foreign Application Priority Data

Jan. 8, 2021    (JP) ................. 2021-002212

(51) Int. Cl.
*B60W 20/13*    (2016.01)
*B60W 20/40*    (2016.01)
(Continued)

(52) U.S. Cl.
CPC .......... *B60W 20/13* (2016.01); *B60W 10/06* (2013.01); *B60W 10/08* (2013.01); *B60W 10/26* (2013.01);
(Continued)

(58) Field of Classification Search
CPC ...... B60W 20/13; B60W 20/12; B60W 20/00; B60W 10/06; B60W 10/08; B60W 10/26;
(Continued)

(56) References Cited

U.S. PATENT DOCUMENTS

| | | | |
|---|---|---|---|
| 2010/0280687 A1* | 11/2010 | Tate, Jr. | ................ B60W 10/26 903/903 |
| 2017/0120888 A1 | 5/2017 | Jinno | |
| 2020/0269835 A1* | 8/2020 | Hara | ..................... G08G 1/143 |

FOREIGN PATENT DOCUMENTS

| | | |
|---|---|---|
| JP | 2012153257 A | 8/2012 |
| JP | 201781416 A | 5/2017 |

OTHER PUBLICATIONS

Kunihiko Jinno et al, "Hybrid Vehicle's Real World Fuel Economy Development by Machine Leaning of Behavior Pattern", Transactions of the Society of Automotive Engineers of Japan vol. 49, No. 2, Mar. 2018, 307-310. 4pp.

* cited by examiner

*Primary Examiner* — George C Jin
(74) *Attorney, Agent, or Firm* — Hauptman Ham, LLP

(57) ABSTRACT

A vehicle controller includes: a prediction unit that acquires position information on a parking place where parking time is predicted to exceed a prescribed threshold value in a travel route of the hybrid vehicle; and a target setting unit that sets a target state of charge of the battery and to change setting of the target state of charge from a first state of charge to a second state of charge that is lower than the first state of charge when the hybrid vehicle satisfies an approach condition to the parking place. A charge and discharge amount of the battery when the state of charge of the battery becomes equal to or less than the second state of charge is controlled to be smaller than the charge and discharge amount of the battery when the state of charge of the battery is larger than the second state of charge.

6 Claims, 5 Drawing Sheets

(51) Int. Cl.
*B60W 10/06* (2006.01)
*B60W 10/08* (2006.01)
*B60W 10/26* (2006.01)

(52) U.S. Cl.
CPC ......... *B60W 20/40* (2013.01); *B60W 2520/04* (2013.01); *B60W 2520/10* (2013.01); *B60W 2556/45* (2020.02); *B60W 2710/0644* (2013.01); *B60W 2710/244* (2013.01)

(58) Field of Classification Search
CPC ............ B60W 10/40; B60W 2520/04; B60W 2520/10; B60W 2556/45; B60W 2710/0644; B60W 2510/244
See application file for complete search history.

VEHICLE CONTROLLER, VEHICLE CONTROL SYSTEM, AND HYBRID VEHICLE

CROSS-REFERENCE TO RELATED APPLICATION

This application claims priority to Japanese Patent Application No. 2021-002212 filed on Jan. 8, 2021, incorporated herein by reference in its entirety.

BACKGROUND

1. Technical Field

The disclosure relates to a vehicle controller, a vehicle control system, and a hybrid vehicle.

2. Description of Related Art

A vehicle controller for a hybrid vehicle, capable of charging a battery with electromotive force generated by an engine, has been known (see Japanese Unexamined Patent Application Publication No. 2017-081416, for example). When the vehicle controller determines, while the vehicle travels with the engine, that the vehicle is moving to a parking place where the vehicle is expected to park longer than prescribed time, the vehicle controller reduces a target state of charge of the battery and causes the vehicle to travel using electric power from a place a prescribed distance before the parking place so as to reduce the state of charge of the battery.

SUMMARY

However, even when the hybrid vehicle travels with electric power from the place before the parking place, there are possibilities that the state of charge of the battery when the vehicle reaches the parking place is not reduced to the target state of charge of the battery or reduced beyond the target state of charge, depending on the traveling state of the vehicle from the place before the parking place to the parking place. This means that the state of charge of the battery may not be maintained close to the target state of charge.

Accordingly, an object of the disclosure is to provide a vehicle controller, a vehicle control system, and a hybrid vehicle, capable of maintaining a state of charge of a battery close to a target state of charge when the hybrid vehicle reaches a parking place.

In order to accomplish the object, the vehicle controller according to a first aspect of the disclosure is a vehicle controller mounted on a hybrid vehicle having a battery chargeable with electric power generated by driving an engine. The vehicle controller includes a prediction unit and a target setting unit. The prediction unit is configured to acquire position information on a parking place where parking time is predicted to exceed a prescribed threshold value in a travel route of the hybrid vehicle. The target setting unit is configured to set a target state of charge of the battery and to change setting of the target state of charge from a first state of charge at normal time to a second state of charge that is lower than the first state of charge when the hybrid vehicle satisfies an approach condition to the parking place. A charge and discharge amount of the battery when the state of charge of the battery becomes equal to or less than the second state of charge is controlled to be smaller than the charge and discharge amount of the battery when the state of charge of the battery is larger than the second state of charge.

In the disclosure according to the first aspect, the charge and discharge amount of the battery when the state of charge of the battery becomes equal to or less than the second state of charge is controlled to be smaller than the charge and discharge amount of the battery when the state of charge of the battery is larger than the second state of charge. In other words, the charge and discharge amount of the battery is stabilized at the timing when the state of charge of the battery becomes equal to or less than the second state of charge. Accordingly, the state of charge of the battery is maintained close to the target state of charge when the hybrid vehicle reaches a parking place.

A vehicle controller according to a second aspect is the vehicle controller according to the first aspect. In the vehicle controller, when the state of charge of the battery becomes equal to or less than the second state of charge, and then the state of charge of the battery becomes larger than the second state of charge, the charge and discharge amount of the battery at the time may be controlled to be maintained.

According to the disclosure of the second aspect, when the state of charge of the battery becomes equal to or less than the second state of charge, and then the state of charge of the battery becomes larger than the second state of charge, the charge and discharge amount of the battery at the time is controlled to be maintained. Therefore, the state of charge of the battery is reliably maintained close to the target state of charge when the hybrid vehicle reaches a parking place.

A vehicle controller according to a third aspect is the vehicle controller according to the first or second aspect. In the vehicle controller, the battery may be controlled to be discharged at a constant discharge rate until the state of charge of the battery becomes equal to or less than the second state of charge after the target setting unit sets the target state of charge to the second state of charge.

In the disclosure according to the third aspect, the battery is discharged at a constant discharge rate until the state of charge of the battery becomes equal to or less than the second state of charge after the target setting unit sets the target state of charge to the second state of charge. Therefore, it is possible to quickly lower the state of charge of the battery to the target state of charge until the hybrid vehicle reaches the parking place.

A vehicle controller according to a fourth aspect is the vehicle controller according to any one of the first to third aspect. In the vehicle controller, an upper limit and a lower limit of the charge and discharge amount of the battery may be determined based on charge capacity of the battery, vehicle speed, and driving characteristics.

In the disclosure according to the fourth aspect, an upper limit and a lower limit of the charge and discharge amount of the battery is determined based on the charge capacity of the battery, the vehicle speed, and the driving characteristics. In other words, the charge and discharge amount is controlled by taking into account the travel state (vehicle speed) and the driving characteristics of the hybrid vehicle. Therefore, even when the target setting unit sets the target state of charge as the second state of charge, the electrical energy of the battery is consumed without deterioration of the battery.

A control system according to a fifth aspect of the disclosure includes the vehicle controller and an acquisition unit. The vehicle controller according to any one of the first to fourth aspects is mounted on a hybrid vehicle. The acquisition unit is configured to be communicable with the vehicle controller and acquire external information at the parking place.

According to the disclosure in the fifth aspect, the acquisition unit acquires external information at the parking place. Therefore, as compared with the case where the acquisition unit does not acquire any external information at the parking location, the state of charge of the battery can reliably be lowered to the target state of charge, and the state of charge of the battery is maintained close to the target state of charge when the hybrid vehicle reaches the parking place.

A hybrid vehicle according to a six aspect of the disclosure includes an engine, a battery, a travel motor, and the vehicle controller according to any one of the first to fourth aspects. The battery is chargeable with electric power generated by driving the engine. The travel motor is driven with the electric power that is charged to the battery. The vehicle travels by switching driving by the engine and driving by the motor.

In the disclosure according to the sixth aspect, as compared with the case where the vehicle controller is not provided, the state of charge of the battery can reliably be lowered to the target state of charge, and the state of charge of the battery is maintained close to the target state of charge when the hybrid vehicle reaches the parking place.

As described above, in the disclosure, the state of charge of the battery can be maintained close to the target state of charge of the battery when the hybrid vehicle reaches the parking place.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described in detail with reference to the drawings.

Figure 1:
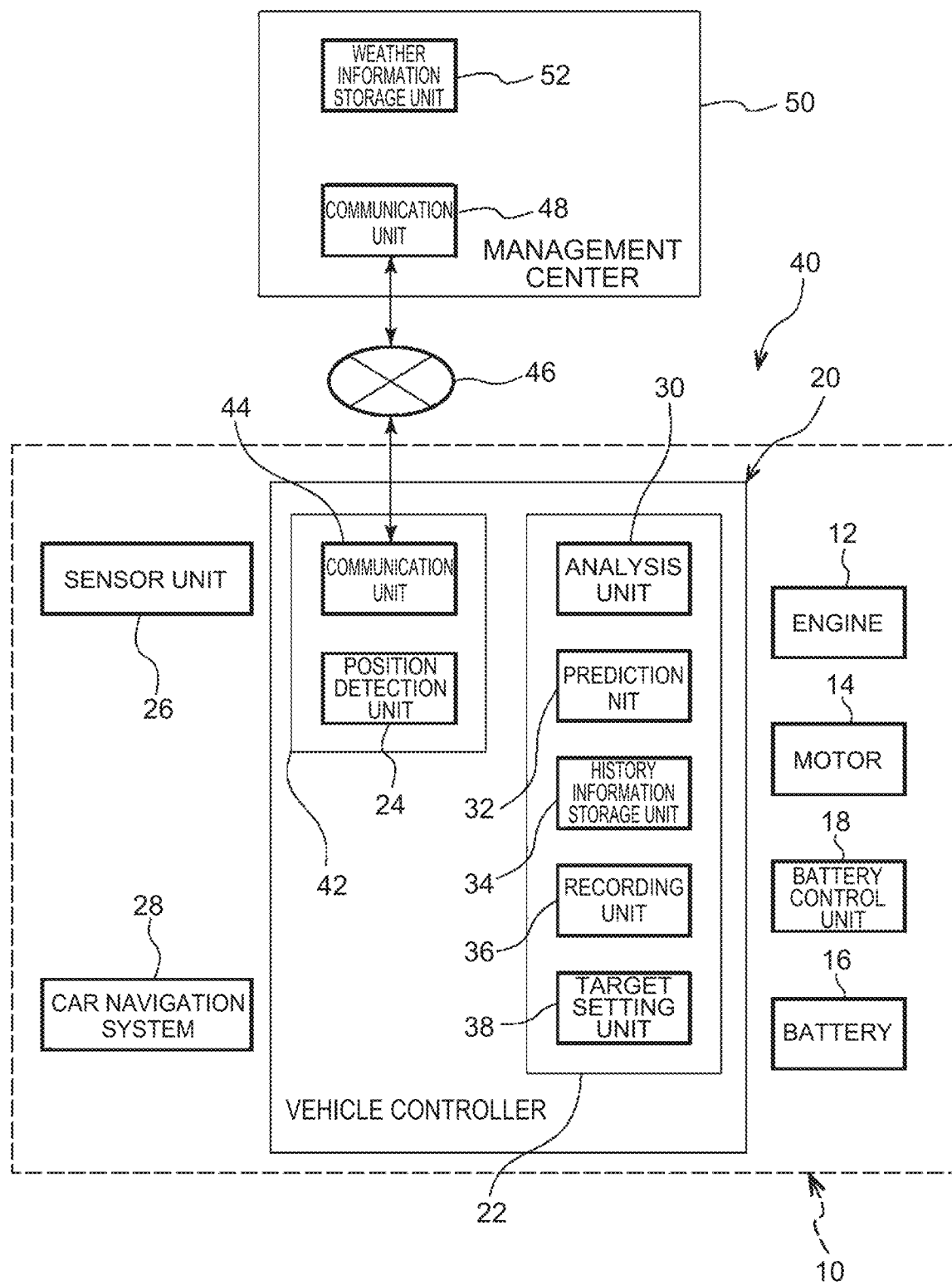
FIG. 1 is a block diagram showing a vehicle controller and a vehicle control system according to an embodiment.

As shown in FIG. 1, a hybrid vehicle 10 is mounted with an engine 12, a battery (lithium-ion secondary battery (storage battery)) 16 chargeable with electric power (electrical energy) generated by driving the engine 12, a traveling motor 14 driven by the electric power charged to the battery 16, a battery control unit 18 that controls the state of charge (which may also be referred to as SOC below) of the battery 16 by controlling the engine 12 and the motor 14, and a vehicle controller 20 that is an electronic device.

Specifically, the hybrid vehicle 10 can travel by appropriately switching two types of driving force from the engine 12 and the motor 14. As described before, the engine 12 is driven for traveling, as well as driven for charging the battery 16. The battery 16 can also be charged by regeneration of the motor 14.

The vehicle controller 20 includes a first controller 22 and a second controller 24. The first controller 22 includes an analysis unit 30, a prediction unit 32, a history information storage unit 34, a recording unit 36, and a target setting unit 38. The second controller 24 includes a position detection unit 42 and a communication unit 44. These components are constituted of electronic control units (ECUs) and software programs executed on the ECUs. The vehicle controller 20 is electrically connected to a sensor unit 26, a car navigation system 28, the engine 12, the motor 14, the battery 16, and the battery control unit 18.

The sensor unit 26 is configured to collect information regarding at least external environments and travel tracks (including vehicle speed and steering angle) of the hybrid vehicle 10. The sensor unit 26 may include a steering angle sensor, a yaw rate sensor, a wheel pulse sensor, a radar, and a direction indicator.

The analysis unit 30 acquires and processes sensing information (which may be referred to as "primary information" below) such as a current position, stop time, start time, and vehicle speed of the hybrid vehicle 10 to generate travel history information (which may be referred to as "secondary information" below), and stores the generated information in the history information storage unit 34. The stop time is the time when the engine 12 is instructed to stop, and the start time is the time when the engine 12 is instructed to start.

The travel history information (secondary information) includes information regarding parking of the hybrid vehicle 10, that is, information indicating date and time of parking (time period and day of the week), parking time, and parking place (destination). The analysis unit 30 is configured to predict one or more parking places (destinations) for the hybrid vehicle 10 based on the travel history information (secondary information) stored in the history information storage unit 34 and weather information stored in a weather information storage unit 52 as will be described later.

The prediction unit 32 is configured to predict a travel route of the hybrid vehicle 10 based on information, such as vehicle speed and steering angle from the sensor unit 26, and route setting information in the car navigation system 28. The prediction unit 32 is configured to acquire, out of one or more parking places (destinations) predicted in the analysis unit 30, position information on the parking place (destination) in the travel route of the hybrid vehicle 10 where the parking time is predicted to exceed a prescribed threshold value. As will be described later, the prediction unit 32 sets a place that is a prescribed distance α before the position of the predicted parking place.

The history information storage unit 34 stores travel history information (secondary information) on the hybrid vehicle 10 based on a vehicle ID of the hybrid vehicle 10. The recording unit 36 is configured to record the primary information as appropriate. The target setting unit 38 is configured to set a target state of charge.

Here, a major change in SOC in the battery 16 causes deterioration of the battery 16. For this reason, an upper limit CU and a lower limit CD are set for the SOC (see FIG. 2). In other words, the battery control unit 18 controls the battery 16 such that the SOC of the battery 16 is within the range (acceptable range) from the upper limit CU to the lower limit CD.

The position detection unit 42 is configured to acquire the current position (position information) of the hybrid vehicle 10 from the sensor unit 26 and the car navigation system 28. The communication unit 44 is configured to periodically transmit the information including the vehicle ID of the hybrid vehicle 10 to a management center 50 as will be described later. The vehicle ID may be information that can uniquely identify the hybrid vehicle 10.

A vehicle control system 40 is built by electrically connecting the vehicle controller 20 and the management center 50 via a communication network 46. In other words, the component members of the vehicle control system 40 are implemented by any combination of hardware and software, which typically include a CPU and a memory of any computer, programs loaded into the memory, a storage unit such as a hard disk that stores the programs, and a network connection interface.

The management center 50 is a server that performs communication (transmission and reception of information) with the vehicle controller 20. The management center 50 includes the weather information storage unit 52 and a communication unit 48 as the acquisition unit. The weather information storage unit 52 is configured to store weather information, indicating estimated temperature of various locations acquired from a meteorological agency, as external information. The communication unit 48 is configured to periodically receive information from the vehicle controller 20, and transmit the weather information stored in the weather information storage unit 52 to the vehicle controller 20.

The hybrid vehicle 10 having the thus-configured vehicle controller 20 actively drives the engine 12 for warm-up operation at the time of startup. Such engine traveling that also serves as warm-up operation is referred to as "cold traveling". Once the engine 12 is sufficiently warmed up (when cold traveling is complete), the vehicle travels thereafter by balancing the driving force by the engine 12 and the motor 14.

During the cold traveling, the hybrid vehicle 10 also rotates an electric power generation motor (not shown) with some of the driving force of the engine 12 to charge the battery 16 at the same time in parallel. Charging the battery 16 using the driving force of the engine 12 during cold traveling is called "cold charging". Methods of cold charging will be described below.

Figure 2:
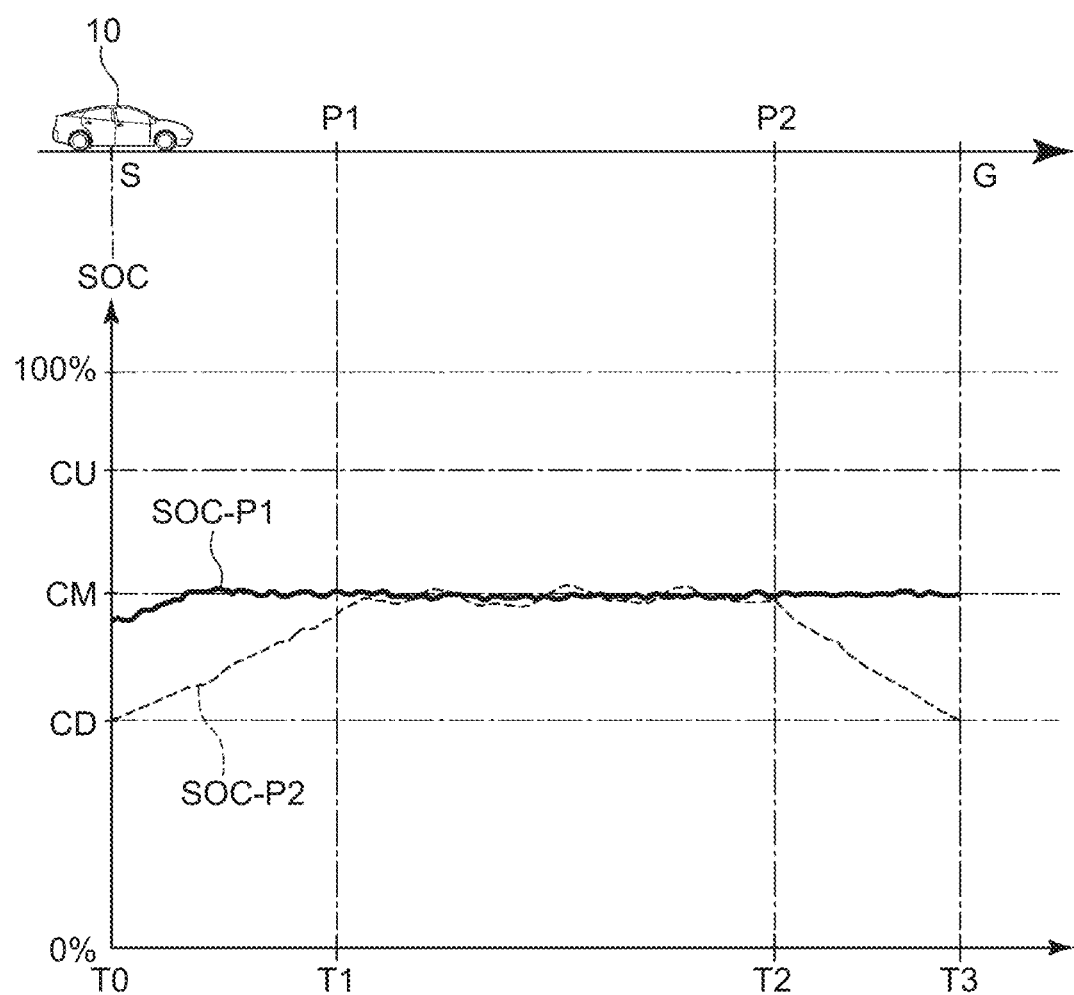
FIG. 2 is a schematic view for describing a cold charging method according to the present embodiment.

As shown in FIG. 2, for example, the hybrid vehicle 10 departs place S at time T0, reaches place P1 at time T1, reaches place P2 at time T2, and reaches Place G at time T3. The place S is a start place, and the place G is a destination. A section from the place S to the place P1 is set as a cold traveling section (hereinafter referred to as "cold section").

In FIG. 2, an upper row shows a travel route of the hybrid vehicle 10, and a lower row shows the change in SOC of the battery 16. The SOC is lowest at 0%, and highest at 100%. For the SOC, an allowable range is set. The allowable range is defined by the lower limit CD and the upper limit CU. For example, the lower limit CD of the SOC is assumed to be about 40%, and the upper limit CU of the SOC is assumed to be about 80%.

The target state of charge is set to, for example, about 65%. Hereinafter, the first state of charge that is a target state of charge at normal time is referred to as "basic target state of charge CM". Therefore, the basic target state of charge CM in the present embodiment is 65%. Based on this setting, a method of cold charging when the target state of charge is fixed to the basic target state of charge CM, and a method of cold charging when the target state of charge is variable will be described.

First, the case of fixing the target state of charge to the basic target state of charge CM will be described. The target state of charge is fixed to the basic target state of charge CM that is between the lower limit CD and the upper limit CU of the SOC. In FIG. 2. SOC-P1 represents a change in charge and discharge amount when the target state of charge is the basic target state of charge CM. In order to maintain the SOC-P1 shown in FIG. 2 close to the basic target state of charge CM, the charge and discharge amount is controlled.

As shown in FIG. 2, when the hybrid vehicle 10 starts at the place S, the hybrid vehicle 10 performs cold traveling for a while, that is, travels by the driving force of the engine 12. In this case, the engine 12 also rotates the electric power generation motor. Since the electric power generation motor functions as an electric power generator, it is possible to perform cold charging.

Here, when an actual SOC is lower than the basic target state of charge CM that is the target state of charge, then cold charging is performed. However, in this case, the SOC-P1 of the hybrid vehicle 10 at time T0 is close to the basic target state of charge CM, and therefore the vehicle 10 hardly receives the benefit of a cold charging effect. In other words, at the start of cold traveling, the actual SOC is already sufficiently large, which leaves little room for cold charging.

Next, the case of setting the target state of charge to be variable will be described. At the place S, the target state of charge is set to the base target state of charge CM that is between the lower limit CD and upper limit CU. This process is the same as in the case where the target state of charge is fixed to the base target state of charge CM. However, the actual SOC in this case is lowered closed to the lower limit CD. Specifically, the change in charge and discharge amount at this time is expressed by SOC-P2 shown in FIG. 2. In order to maintain the SOC-P2 shown in FIG. 2 close to the basic target state of charge CM, the charge and discharge amount is also controlled.

As shown in FIG. 2, when the hybrid vehicle 10 starts at the place S, cold charging raises the SOC-P2 up to the basic target state of charge CM. In other words, since the actual SOC at startup is sufficiently lower than the basic target state of charge CM, the vehicle 10 can receive the benefit of the cold charging effect (effective cold-charged is performed).

Figure 3:
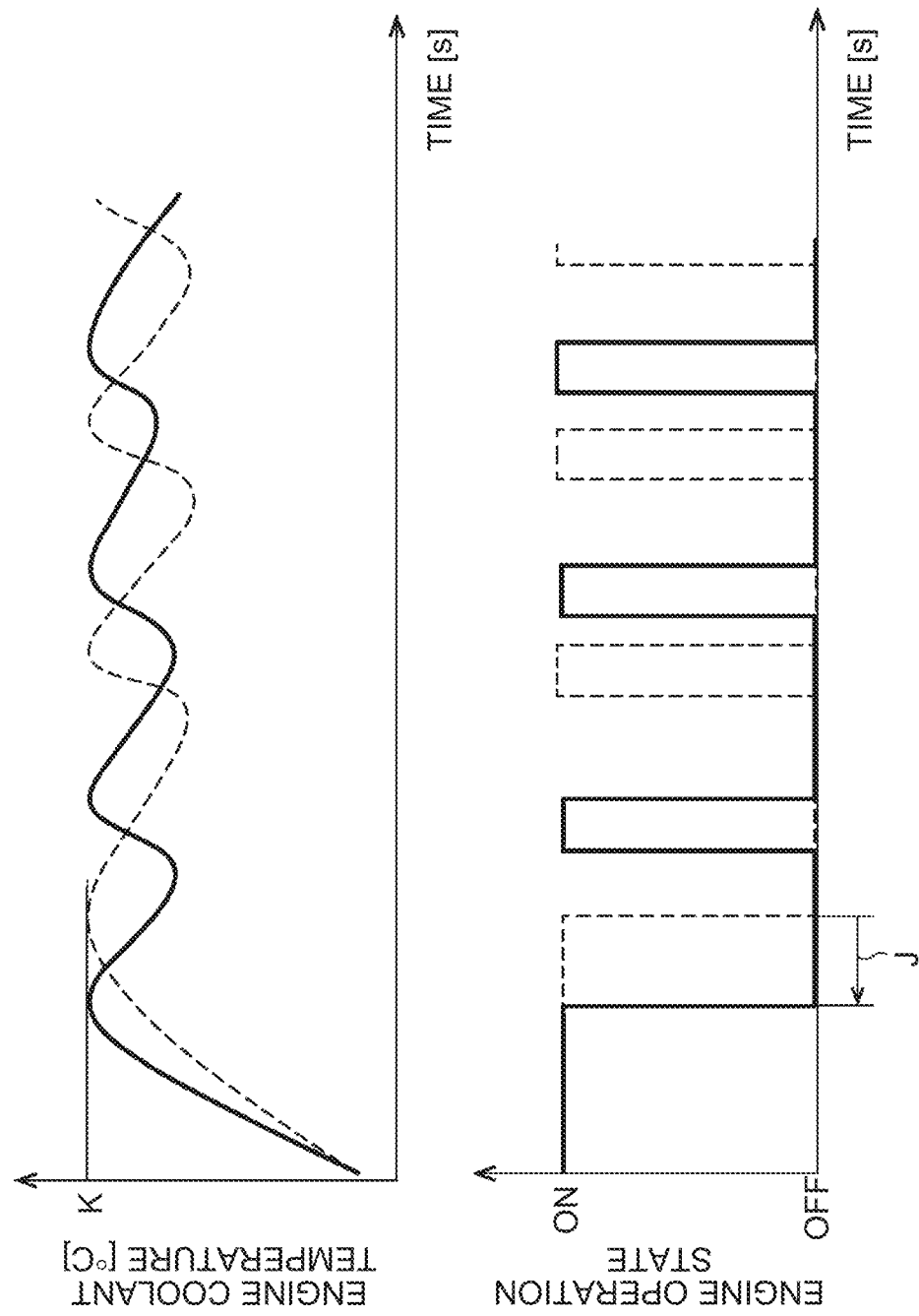
FIG. 3 is a graph showing the relationship between engine coolant temperature and engine operation state when warm-up operation is performed in the case of a high SOC and a low SOC in a hybrid vehicle according to the present embodiment.

Since cold charging can also apply load to the engine 12, the cold charging provide a side effect of promoting warm-up of the engine 12 as shown in FIG. 3. Specifically, when the actual SOC at startup is, for example, less than 50%, the engine coolant temperature can reach a target temperature K (° C.) earlier by a specified time J (e.g., J=several hundred seconds) than when the actual SOC at startup is, for example, 50% or more. As a result, the cold period can be shortened (the engine 12 can be stopped earlier).

In this way, in order to allow the hybrid vehicle 10 to receive the benefit of the cold charging effect (to enhance the efficiency of cold charging), it is needed to sufficiently lower the actual SOC at the beginning of the cold traveling, that is, to set the actual SOC to be at least lower than the target state of charge (basic target state of charge CM) to be specific. Therefore, when the hybrid vehicle 10 restarts from the place G, it is desirable that the target state of charge be reduced to the second state of charge (hereinafter referred to as "special target state of charge") that is close to the lower limit CD (close to charge and discharge amount=around 0: see FIG. 5B).

This allows the vehicle 10 to receive the benefit of the cold charging effect in the case of restarting from the place G. Moreover, cold charging can promote warm-up of the engine 12, which in turn shortens the cold section. In this way, receiving the benefit of the cold charging effect and shortening the cold section lead to fuel savings (enhanced fuel efficiency).

In order to lower the target state of charge (target SOC) to the special target state of charge when the hybrid vehicle 10 restarts from the place G, it is necessary to accurately predict the place G (destination). Such predictions can be made possible by, for example, a prediction model using Bayesian statistic.

More specifically, the position detection unit 42 first acquires the current position (position information) of the hybrid vehicle 10 from the sensor unit 26 and the car navigation system 28. In this case, the analysis unit 30 acquires the vehicle speed. When there is stop or start of the vehicle 10, the analysis unit 30 also acquires the time of such events. The analysis unit 30 then updates the travel history information (secondary information) in the history information storage unit 34.

With the update operation, the travel history information (secondary information) on the hybrid vehicle 10 is accumulated in the history information storage unit 34. When the analysis unit 30 detects parking, the analysis unit 30 updates frequency of traveling from the previous parking place to the current parking place. As a result, the travel route information is updated. The information sensed as primary information is also recorded in the recording unit 36.

The analysis unit 30 also predicts future parking places from prediction information regarding the most likely travel route that is based on the current position of the hybrid vehicle 10 and the travel history information thereon. In short, the analysis unit 30 predicts one or more parking places as candidates of the destination. The analysis unit 30 further calculates the estimated time of arrival at each candidate. The estimated time of arrival can be calculated using algorithms similar to those performed by the car navigation system 28 or the like.

Figure 4:
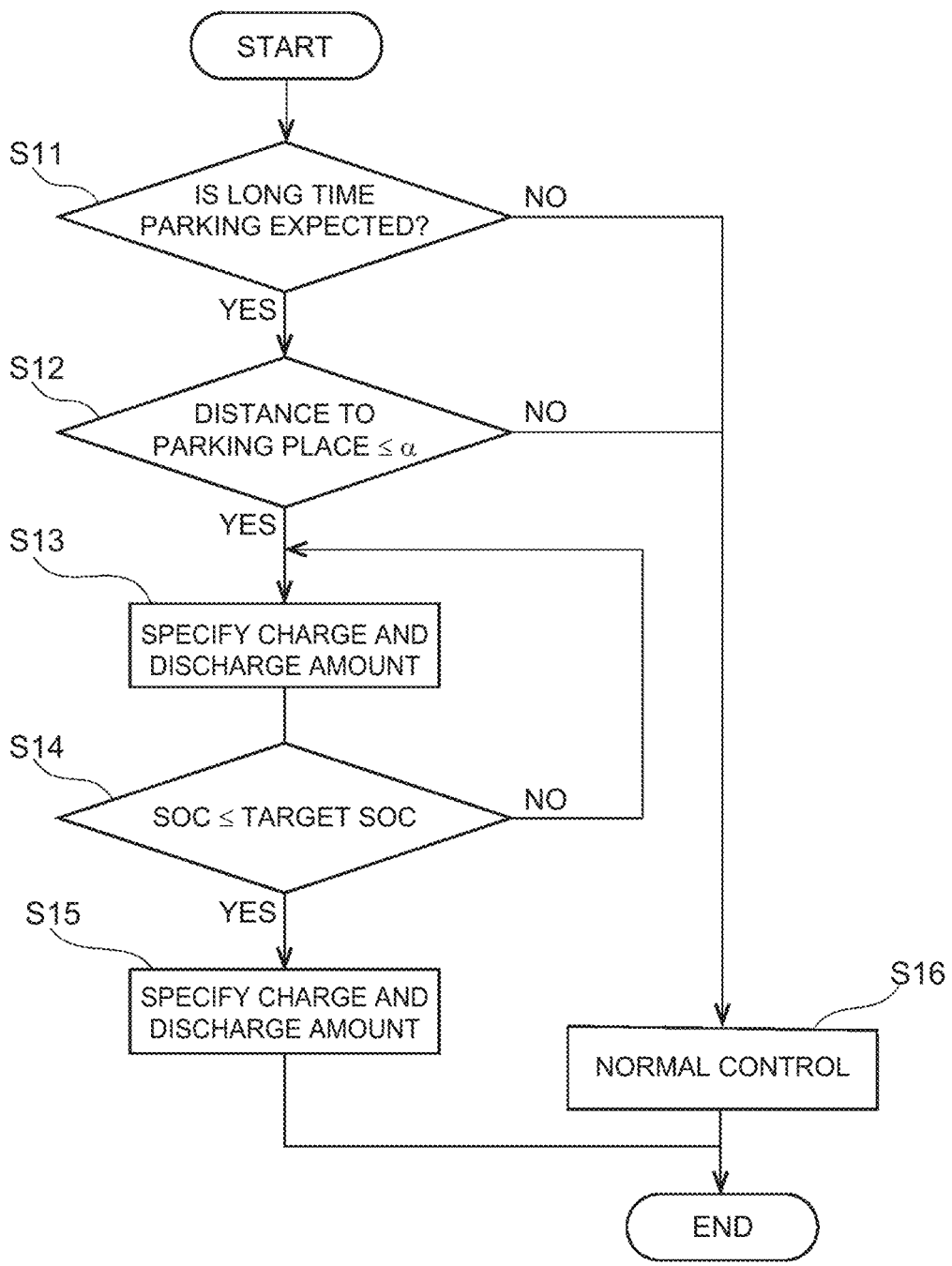
FIG. 4 is a flowchart showing a control process according to the present embodiment.

The analysis unit 30 then predicts parking time at each candidate of the destination and predicts the candidate where the vehicle 10 is expected to park for a long time as a destination as shown in FIG. 4 (step S11). The analysis unit 30 may be configured to correct the parking time according to the estimated temperature at scheduled time of arrival at each candidate transmitted from the management center 50. The weather information storage unit 52 in the management center 50 stores estimated temperature of each location as weather information.

The prediction unit 32 predicts a travel route from a predicted transit point and destination, and sets as a place P2 a place that is a predetermined distance α before the destination. When the predicted transit point and destination are changed before the vehicle reaches the destination, the prediction unit 32 resets the place P2 accordingly.

Thus, the hybrid vehicle 10 can predict the place G (destination) while traveling, and can set the place P2 to the place that is predetermined distance α before the place G. Once the place P2 is set, the position detection unit 42 periodically detects the current position of the hybrid vehicle 10, and the analysis unit 30 determines whether or not the hybrid vehicle 10 has reached the place P2 (step S12).

Then, when the analysis unit 30 determines that the hybrid vehicle 10 has actually reached the place P2 (when the hybrid vehicle 10 satisfies an approach condition to the parking place, and satisfies the condition of being equal to or less than the distance α in FIG. 4), the target setting unit 38 lowers the target state of charge to the special target state of charge that is lower than the basic target state of charge CM.

As a result, the battery control unit 18 controls the charge and discharge amount of the battery 16 such that the battery 16 is discharged, so that the electrical energy of the battery 16 is actively consumed after the place P2. In the present embodiment, the discharge amount in the charge and discharge amount of the battery 16 is forcibly specified to ensure execution of the control (step S13).

Figure 5A:
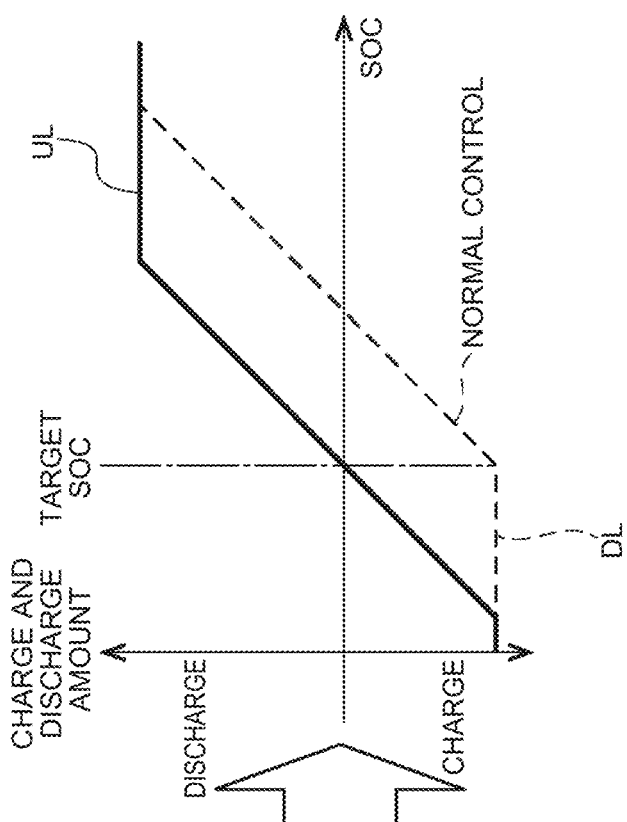
FIG. 5A is a graph showing the charge and discharge amount with respect to SOC of a battery according to the present embodiment.

Specifically, as shown in FIG. 5A, when the target setting unit 38 sets the target state of charge to the special target state of charge (target SOC), the battery control unit 18 controls the battery 16 such that the charge and discharge amount of the battery 16 is equal to an upper limit UL of the discharge side of the charge and discharge amount of the battery 16 at normal time (when the target setting unit 38 does not set the target state of charge to the special target state of charge).

More specifically, as shown in FIG. 4, the battery control unit 18 determines whether or not the state of charge (SOC) of the battery 16 is equal to or less than the special target state of charge (target SOC) (step S14). Then, as shown by a solid line in FIG. 5A, until the state of charge (SOC) of the battery 16 becomes equal to or less than the special target state of charge (target SOC), the discharge amount of the battery 16 is set to the constant upper limit UL (processing is returned to step S13). Hence, the battery 16 is continuously discharged at the constant upper limit UL of the discharge amount.

To continuously discharge the battery 16 at the constant upper limit UL of the discharge amount, the electrical energy of the battery 16 may be preferentially used as the driving force of the traveling motor 14, and also be used to charge auxiliary batteries (illustration omitted), after the place P2, for example.

This allows the hybrid vehicle 10 to more actively consume the electrical energy of the battery 16 until the hybrid vehicle 10 reaches the place G (destination), and makes it possible to quickly lower the state of charge (SOC) of the battery 16 to the special target state of charge (target SOC). Therefore, when the hybrid vehicle 10 reaches the place G, the actual state of charge (SOC) can efficiently and reliably be lowered closed to the lower limit CD (special target state of charge) shown in FIG. 2.

Figure 5B:
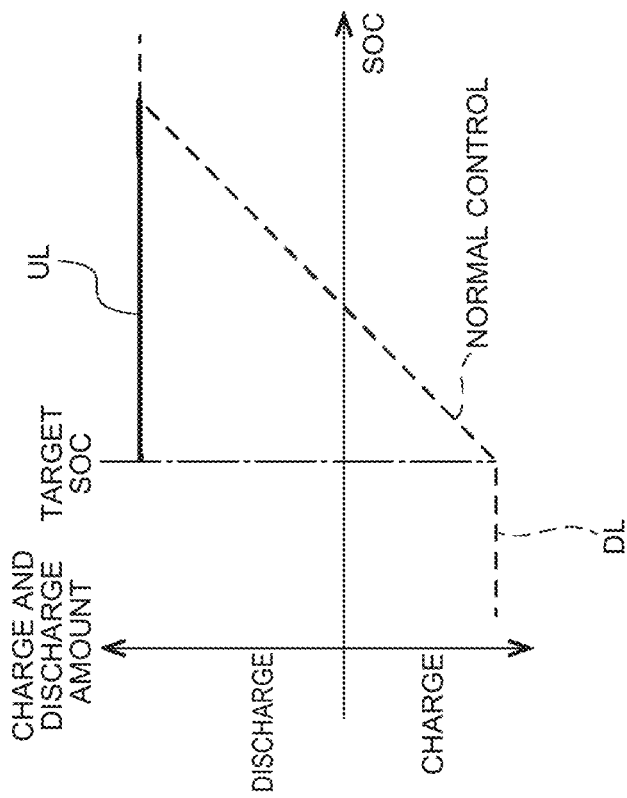
FIG. 5B is a graph showing the charge and discharge amount with respect to SOC of a battery according to the present embodiment.

Then, when the state of charge (SOC) of the battery 16 becomes equal to or less than the special target state of charge (target SOC), the charge and discharge amount of the battery 16 is returned to that of normal time as shown in FIG. 5B. Specifically, as shown in FIG. 4, the charge and discharge amount of the battery 16 is controlled (specified) to be smaller than when the charge and discharge amount of the battery 16 is set to the constant upper limit UL of the discharge amount (when the SOC is larger than the special target state of charge) (step S15).

In other words, the charge and discharge amount of the battery 16 is stabilized at the timing when the state of charge (SOC) of the battery 16 becomes equal to or less than the special target state of charge (target SOC). Accordingly, the state of charge (SOC) of the battery 16 can be maintained close to the target state of charge (target SOC), when the hybrid vehicle 10 reaches the place G.

When the state of charge (SOC) of the battery 16 becomes equal to or less than the special target state of charge (target SOC), and then the state of charge (SOC) of the battery 16 becomes larger than the special target state of charge (target SOC), the charge and discharge amount of the battery 16 at the time is maintained. Accordingly, the state of charge (SOC) of the battery 16 can reliably be maintained close to the special target state of charge (target SOC), when the hybrid vehicle 10 reaches the place G.

Note that loop processing by the vehicle controller 20 shown in FIG. 4 is repeatedly executed at regular intervals, for example, every few seconds. When long parking is not expected and when the vehicle 10 does not yet reach the place P2, control at normal time is executed (step S16). Specifically, as shown in FIG. 5B, at any state of charge (SOC), the charge and discharge amount of the battery 16 is controlled to be within the range that is between an upper limit UL (shown by a solid line) and a lower limit DL (shown by a dashed line).

The upper limit UL and the lower limit DL of the charge and discharge amount of the battery 16 at the normal time are determined based on charge capacity of the battery 16, vehicle speed of the hybrid vehicle 10 (rotation speed of a propeller shaft that transmits motive power generated by the engine 12 to the wheels), and driving characteristics (accelerator operation amount by a driver or the like, which is referred to as "request from the driver" below).

Specifically, at normal time, the charge and discharge amount is controlled by taking into account the charging capacity of the battery 16 as well as the travel state (vehicle speed) of the hybrid vehicle 10 and the driving characteristics (request from the driver). Therefore, even when the target setting unit 38 sets the target state of charge to the special target state of charge, the electrical energy of the battery 16 can be consumed without deterioration of the battery 16.

In addition, instead of setting the place P2 to the place that is a prescribed distance α before the destination, the place P2 may be set to the place prescribed time T before the destination (the approach condition may be time T instead of distance α). In this case, in step S12, the current time is periodically detected to determine whether or not the prescribed time T has elapsed. The approach condition may also be determined based on the driving characteristics (request from the driver) in addition to the distance α or the time T.

Moreover, since the information obtained by communication with the management center 50 is only the weather information, it is possible to control the charge and discharge amount of the battery 16 in real time, and to reduce the risk of control failure due to communication disruption. When the information obtained by communication with the management center 50 includes other vehicle information, traffic congestion information or the like can be reflected upon the charge and discharge control. This makes it possible to reach the target state of charge with high accuracy.

As described in the foregoing, the vehicle controller 20, the vehicle control system 40, and the hybrid vehicle 10 according to the present embodiment have been described with reference to the drawings. However, the vehicle controller 20, the vehicle control system 40, and the hybrid vehicle 10 according to the present embodiment are not limited to those shown in the drawings. Appropriate modifications are possible without departing from the scope of the disclosure. For example, the car navigation system 28 may be replaced with a GPS function.

In the vehicle control system 40, the analysis function included in the vehicle controller 20 may be incorporated in the management center 50. Specifically, the management center 50 may include the analysis unit 30 and the history information storage unit 34. This makes it possible to reduce the specification of the calculation processor on the side of the hybrid vehicle 10.

Moreover, when the external information is used in the management center 50, the information may be used in two forms. In one form, all pieces of the data are transmitted to the side of the hybrid vehicle 10 and determination is made on the side of the hybrid vehicle 10. In the other form, determination is made in the management center 50, and then only a command is transmitted to the side of the hybrid vehicle 10. The latter form can reduce an arithmetic load on the side of the hybrid vehicle 10.

What is claimed is:

1. A vehicle controller mounted on a hybrid vehicle having a battery chargeable with electric power generated by driving an engine, comprising:
    a prediction unit configured to acquire position information on a parking place where parking time is predicted to exceed a prescribed threshold value in a travel route of the hybrid vehicle; and
    a target setting unit configured to set a target state of charge of the battery and to change setting of the target state of charge from a first state of charge at normal time to a second state of charge that is lower than the first state of charge when the hybrid vehicle satisfies an approach condition to the parking place, wherein
    a charge and discharge amount of the battery when the state of charge of the battery becomes equal to or less than the second state of charge is controlled to be smaller than the charge and discharge amount of the battery when the state of charge of the battery is larger than the second state of charge.

2. The vehicle controller according to claim 1, wherein when the state of charge of the battery becomes equal to or less than the second state of charge, and then the state of charge of the battery becomes larger than the second state of charge, the charge and discharge amount of the battery at the time is controlled to be maintained.

3. The vehicle controller according to claim 1, wherein the battery is controlled to be discharged at a constant discharge rate until the state of charge of the battery becomes equal to or less than the second state of charge after the target setting unit sets the target state of charge to the second state of charge.

4. The vehicle controller according to claim 1, wherein an upper limit and a lower limit of the charge and discharge amount of the battery is determined based on charge capacity of the battery, vehicle speed, and driving characteristics.

5. A vehicle control system, comprising:
    the vehicle controller according to claim 1 mounted on a hybrid vehicle; and
    an acquisition unit configured to be communicable with the vehicle controller and acquire external information at the parking place.

6. A hybrid vehicle, comprising:
    an engine;
    a battery chargeable with electric power generated by driving the engine;
    a travel motor driven with the electric power that is charged to the battery; and
    the vehicle controller according to claim 1, wherein the vehicle travels by switching driving by the engine and driving by the motor.

* * * * *